(12) United States Patent
Shoda et al.

(10) Patent No.: US 11,264,928 B2
(45) Date of Patent: Mar. 1, 2022

(54) CONTROL DEVICE FOR ELECTRIC MOTOR AND CABLE DISCONNECTION DETECTION METHOD

(71) Applicant: Mitsubishi Electric Corporation, Tokyo (JP)

(72) Inventors: Tomohisa Shoda, Tokyo (JP); Masutaka Watanabe, Tokyo (JP); Yoshimasa Nishijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/958,811

(22) PCT Filed: Feb. 8, 2018

(86) PCT No.: PCT/JP2018/004475
§ 371 (c)(1),
(2) Date: Jun. 29, 2020

(87) PCT Pub. No.: WO2019/155585
PCT Pub. Date: Aug. 15, 2019

(65) Prior Publication Data
US 2021/0075355 A1    Mar. 11, 2021

(51) Int. Cl.
*G05B 5/00*    (2006.01)
*H02H 7/08*    (2006.01)
(Continued)

(52) U.S. Cl.
CPC .............. *H02P 21/22* (2016.02); *H02P 21/18* (2016.02); *H02P 27/12* (2013.01)

(58) Field of Classification Search
CPC ........... H02P 21/22; H02P 21/18; H02P 27/12
(Continued)

(56) References Cited

U.S. PATENT DOCUMENTS 7,759,888 B2 * 7/2010 Matsui ................ H02H 7/0805
318/400.29
2009/0314564 A1 * 12/2009 Okamura ............ B60L 15/2054
180/65.285
(Continued)

FOREIGN PATENT DOCUMENTS

JP    5910460 B2    4/2016

OTHER PUBLICATIONS

International Search Report (PCT/ISA/210) dated May 1, 2018 issued by the International Searching Authority in International Application No. PCT/JP2018/004475.
(Continued)

*Primary Examiner* — Erick D Glass
(74) *Attorney, Agent, or Firm* — Sughrue Mion, PLLC; Richard C. Turner

(57) ABSTRACT

A control device for an electric motor includes: a controller configured to apply switching control to an inverter configured to execute power conversion in accordance with a torque command, to thereby control AC power to be supplied to the electric motor; and a current sensor configured to detect a phase current, which flows through an AC cable configured to connect the electric motor and the inverter to each other, wherein the controller includes a disconnection detection unit configured to acquire the phase current detected by the current sensor as a phase current detection value, calculate based on the torque command a phase current command value directed to the electric motor, and determine presence or absence of a disconnection of the AC cable in each phase from a transition result of a difference value between the phase current command value and the phase current detection value in each phase.

7 Claims, 7 Drawing Sheets

(51) Int. Cl.
  *H02P 1/04*   (2006.01)
  *H02P 21/22*  (2016.01)
  *H02P 21/18*  (2016.01)
  *H02P 27/12*  (2006.01)

(58) Field of Classification Search
  USPC .......................................................... 318/474
  See application file for complete search history.

(56) References Cited

U.S. PATENT DOCUMENTS

| | | | | |
|---|---|---|---|---|
| 2015/0171778 | A1* | 6/2015 | Suzuki | ................ H02P 29/0243 |
| | | | | 318/400.14 |
| 2015/0188473 | A1* | 7/2015 | Kakizaki | ................... H02P 6/12 |
| | | | | 318/400.02 |
| 2017/0163201 | A1* | 6/2017 | Nakamoto | ............ H02P 29/024 |

OTHER PUBLICATIONS

Written Opinion (PCT/ISA/237) dated May 1, 2018 issued by the International Searching Authority in International Application No. PCT/JP2018/004475.

* cited by examiner

CONTROL DEVICE FOR ELECTRIC MOTOR AND CABLE DISCONNECTION DETECTION METHOD

TECHNICAL FIELD

The present invention relates to a control device for an electric motor and a cable disconnection detection method, which are configured to detect a disconnection of a power connection line configured to couple an electric motor and a power conversion device to each other.

BACKGROUND ART

In recent years, a vehicle on which an internal combustion engine and an electric motor are mounted, which is a so-called hybrid vehicle, and an electric vehicle, on which only an electric motor is mounted for traveling, have come to be widely used in order to reduce emission of carbon dioxide or to increase fuel efficiency. On those electrically driven vehicles, on which the electric motor is mounted, a power storage device configured to output DC power and a power conversion device configured to convert the DC power from the power storage device to AC power to supply the power to the electric motor are mounted in addition to the electric motor.

When a disconnection or a short circuit occurs in a power connection line configured to couple the electric motor and the power conversion device to each other in such an electrically driven vehicle, there is a fear that the electric motor may not be able to normally operate and an excessive current may flow through the power conversion device and the electric motor. As a result, a failure of the electric motor and the power conversion device may be caused. Moreover, the electric motor does not operate normally, and thus there is a rear that unintended vehicle vibration may occur, resulting in discomfort for a driver and passengers.

In order to solve the above-mentioned problems, there is a related art for detecting the disconnection of the power connection line configured to couple the electric motor and the power conversion device to each other (for example, see Patent Literature 1).

CITATION LIST

Patent Literature

[PTL 1] JP 5910460 B2

SUMMARY OF INVENTION

Technical Problem

However, the related art has the following problems. In Patent Literature 1, a phase current flowing through the electric motor is compared with a determination value in order to determine the disconnection. Therefore, for example, in a case of a small current, the detection of the disconnection of the power connection line may become difficult depending on setting of the determination value.

Moreover, in Patent Literature 1, the disconnection of the power connection line is detected based on the determination that uses the phase current and determination that uses a change speed of the phase current. However, in a case of an AC electric motor, when the electric motor stops at a specific rotation angle, there exists a phase in which a current does not flow. As a result, even when the phase in which a current does not flow is not disconnected, both of the phase current and the change speed of the phase current are zero, and thus there is a fear that an erroneous determination of a disconnection may be made.

The present invention has been made in view of the above-mentioned problem, and has an object to provide a control device for an electric motor and a cable disconnection detection method, which are capable of detecting with high precision a disconnection of a power connection line configured to couple an electric motor and a power conversion device to each other.

Solution to Problem

According to one embodiment of the present invention, there is provided a control device for an electric motor including: a controller configured to apply switching control to a switching element, which is provided in an inverter configured to invert DC power supplied from a DC power supply to AC power, in accordance with a torque command supplied from an outside, to thereby control the AC power to be supplied to the electric motor; and a current sensor configured to detect a phase current, which flows through an AC cable configured to connect the electric motor and the inverter to each other, wherein the controller includes a disconnection detection unit configured to acquire the phase current detected by the current sensor as a phase current detection value, calculate, based on the torque command, a command current directed to the electric motor as a phase current command value, and determine presence or absence of a disconnection of the AC cable in each phase from a transition result of a difference value between the phase current command value and the phase current detection value in each phase.

Further, according to one embodiment of the present invention, there is provided a cable disconnection detection method, which is executed in a control device for an electric motor, the control device for an electric motor including; a controller configured to apply switching control to a switching element, which is provided in an inverter configured to invert DC power supplied from a DC power supply to AC power, in accordance with a torque command supplied from an outside, to thereby control the AC power to be supplied to the electric motor; and a current sensor configured to detect a phase current, which flows through an AC cable configured to connect the electric motor and the inverter to each other, the cable disconnection detection method, which is executed by the controller, including: a storage step of storing in advance, in a storage unit, a determination threshold value and a disconnection determination number of times, which are used to determine presence or absence of a disconnection of the AC cable; a detection value acquisition step of acquiring the phase current detected by the current sensor as a phase current detection value; a command value calculation step of calculating, based on the torque command, a command current directed to the electric motor as a phase current command value; an integration step of calculating, for each phase, a difference value between the phase current detection value and the phase current command value in each calculation cycle, and integrating respective difference values calculated over a plurality of calculation cycles included in a period from a calculation start point to a calculation end point, to thereby repeatedly calculate an integration value corresponding to the period; and a disconnection determination step of calculating a ratio between a previous value and a current value of the integration value, and determining that a disconnection of the AC cable has occurred when a state in which the ratio is higher than the determination threshold value stored in the storage unit continues for the disconnection determination number of times stored in the storage unit.

Advantageous Effects of Invention

The present invention has the configuration in which the disconnection of the power connection line is detected based on the transition result of the difference value between the current command value and the current detection value of the electric motor. As a result, it is possible to provide the control device for an electric motor and the cable disconnection detection method, which are capable of detecting with high precision the disconnection of the power connection line configured to couple the electric motor and the power conversion device to each other.

DESCRIPTION OF EMBODIMENTS

Figure 1:
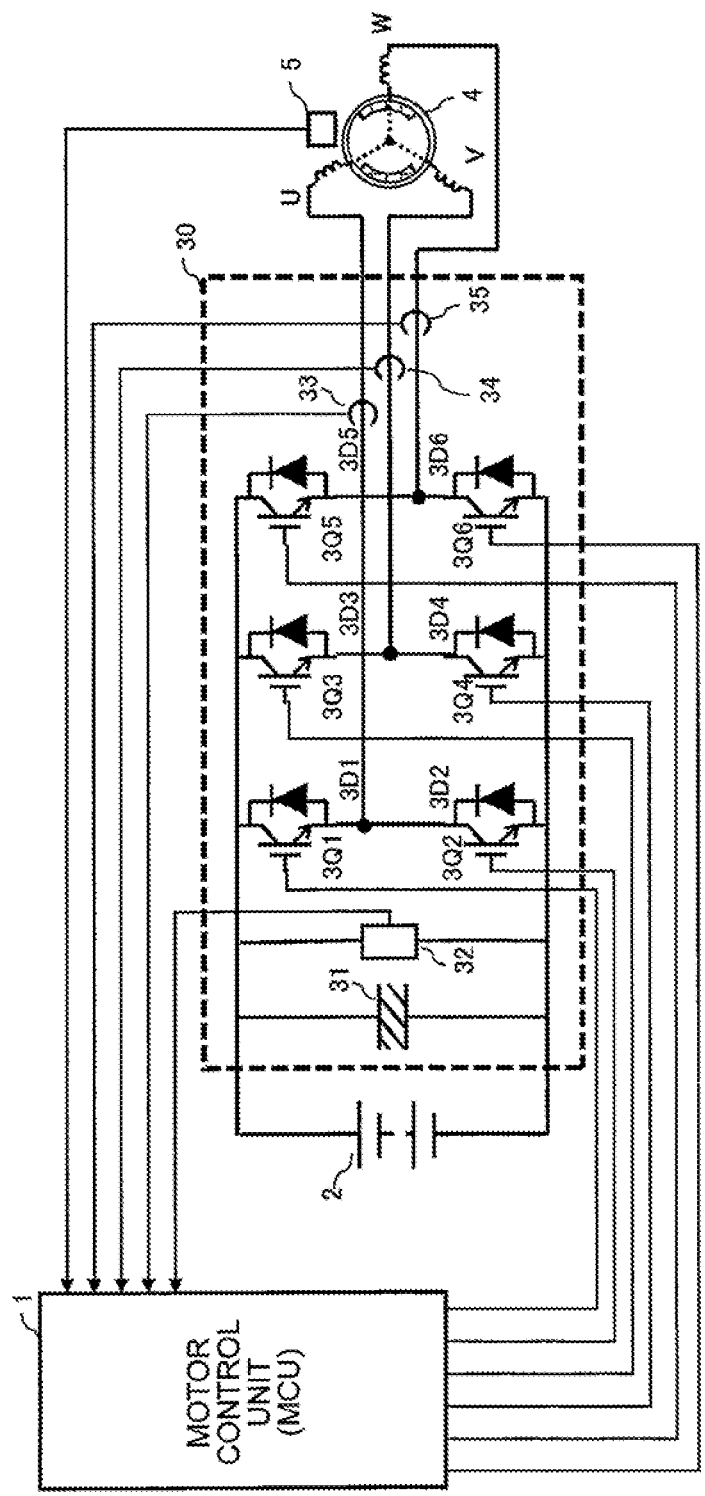
FIG. 1 is an overall configuration diagram for illustrating a control device for an electric motor including a power conversion device according to a first embodiment of the present invention.

Referring to the drawings, a description is now given of a control device for an electric motor and a cable disconnection detection method according to preferred embodiments of the present invention.

FIG. 1 is an overall configuration diagram for illustrating the control device for an electric motor including a power conversion device according to a first embodiment of the present invention. The control device for an electric motor illustrated in FIG. 1 includes a motor control unit 1, a battery 2, an electric motor 4, a rotation angle sensor 5, and a power conversion device 30.

The motor control unit 1 is a controller configured to execute calculation processing relating to drive control for a power conversion unit, and is hereinafter referred to as "MCU". The battery 2 is a power supply configured to supply DC power. The power conversion device 30 is a converter provided in parallel with the battery 2 and configured to invert the DC power from the battery 2 to AC power, and is hereinafter referred to as "inverter".

The electric motor 4 is configured to generate a driving force through use of the AC power supplied from the inverter 30, so as to be rotationally driven. The electric motor 4 is connected to wheels (not shown) through a power transmission mechanism (not shown). The rotation angle sensor 5 is configured to output a rotation angle signal in accordance with a rotation of the electric motor 4.

The inverter 30 includes switching elements configured to invert the DC power from the battery 2 to the AC power to be supplied to the electric motor 4 in accordance with switching signals output from the MCU 1. Specifically, the switching elements include a U-phase upper switching element 3Q1, a U-phase lower switching element 3Q2, a V-phase upper switching element 3Q3, a V-phase lower switching element 3Q4, a W-phase upper switching element 305, and a W-phase lower switching element 3Q6.

Further, a U-phase upper diode element 3D1, a U-phase lower diode element 3D2, a V-phase upper diode element 3D3, a V-phase lower diode element 3D4, a W-phase upper diode element 3D5, and a W-phase lower diode element 3D6 are connected to the respective switching elements in anti-parallel.

Moreover, the inverter 30 further includes a smoothing capacitor 31 and a voltage sensor 32. The smoothing capacitor 31 is configured to smooth a DC voltage supplied from the battery 2. The voltage sensor 32 is configured to detect a value of the supplied DC voltage.

In the electric motor 4, one ends of three coils in the U phase, the V phase, and the W phase are connected to a neutral point. Meanwhile, the other ends of the three coils in the U phase, the V phase, and the W phase are connected to intermediate points of the switching elements in the respective phases. Moreover, a U-phase current sensor 33, a V-phase current sensor 34, and a W-phase current sensor 35 are attached to AC cables corresponding to power connection lines configured to connect the inverter 30 and the electric motor 4 to each other.

Figure 2:
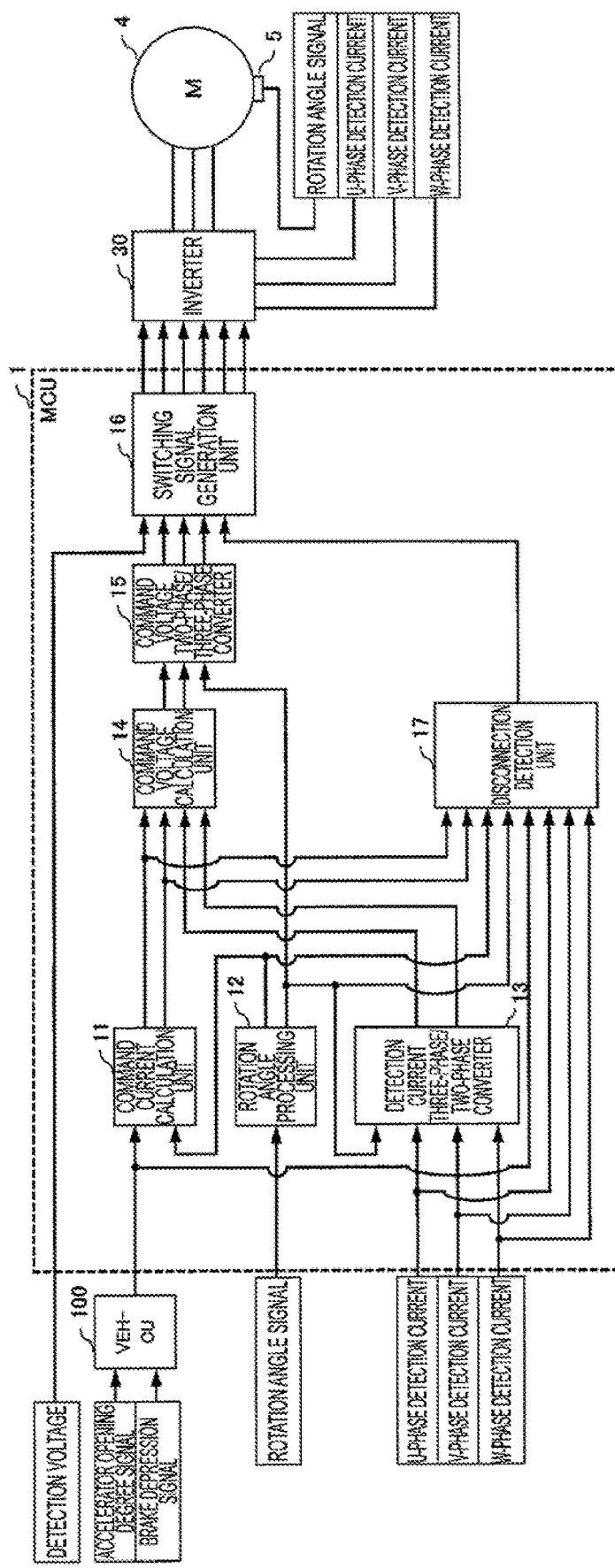
FIG. 2 is a functional block diagram of an MCU applied to the control device for an electric motor according to the first embodiment of the present invention.

FIG. 2 is a functional block diagram of the MCU 1 to be applied to the control device for an electric motor according to the first embodiment of the present invention. The MCU 1 illustrated in FIG. 2 has a function of generating switching signals so as to control the inverter 30 and a function of detecting a disconnection of the AC cables. A detailed description is now given of each of the functions.

A vehicle control unit 100, which is mounted on the vehicle and is configured to execute operation control for the vehicle, reads an accelerator opening degree signal and a brake depression signal, which indicate behaviors of a driver, and outputs a command torgue Ttar to the MCU 1. In the following description, the vehicle control unit is referred to as "VEH-CU".

A command current calculation unit 11 receives the command torque Ttar calculated by the VEH-CU 100 and a rotational speed Nm calculated by a rotation angle processing unit 12 described later. Then, the command current calculation unit 11 calculates a d-axis command current Idtar and a q-axis command current Iqtar from a torque-current map stored in advance in a ROM (not shown) included in the MCU 1. The d-axis command current Idtar and the q-axis command current Iqtar calculated by the command current calculation unit 11 are input to a command voltage calculation unit 14.

The rotation angle processing unit 12 is configured to calculate the rotational speed Nm and an electrical angle $\theta$ of the electric motor 4 based on a rotation angle signal output from a rotation angle sensor 5 provided for the electric motor 4. The rotational speed Nm calculated by the rotation angle processing unit 12 is input to the command current calculation unit 11 and a disconnection detection unit 17. Meanwhile, the electrical angle θ calculated by the rotation angle processing unit 12 is input, to a detection current three-phase/two-phase converter 13, a command voltage two-phase/three-phase converter 15, and the disconnection detection unit 17.

The detection current three-phase/two-phase converter 13 receives detection currents detected by the current sensors (the U-phase current sensor 33, the V-phase current sensor 34, and the W-phase current sensor 35) in the respective phases attached to the AC cables configured to connect the inverter 30 and the electric motor 4 to each other, and the electrical angle θ calculated by the rotation angle processing unit 12. Then, the detection current three-phase/two-phase converter 13 uses the electrical angle θ to coordinate-convert the detection currents in the three phases to a d-axis current Idact and a q-axis current Iqact. The d-axis current Idact and the q-axis current Iqact converted by the detection current three-phase/two-phase converter 13 are input to the command voltage calculation unit 14.

The command voltage calculation unit 14 receives the d-axis command current Idtar and the q-axis command current Iqtar calculated by the command current calculation unit 11 and the d-axis current Idact and the q-axis current Iqact converted by the detection current three-phase/two-phase converter 13. Then, the command voltage calculation unit 14 executes current feedback control based on a difference between the d-axis command current Idtar and the d-axis current Idact and a difference between the q-axis command current Iqtar and the q-axis current Iqact, to thereby calculate a d-axis command voltage Vdtar and a q-axis command voltage Vqtar.

The command voltage two-phase/three-phase converter 15 receives the d-axis command voltage Vdtar and the q-axis command voltage Vqtar calculated by the command voltage calculation unit 14 and the electrical angle θ calculated by the rotation angle processing unit 12. Then, the command voltage two-phase/three-phase converter 15 calculates a U-phase command voltage Vutar, a V-phase command voltage Vvtar, and a W-phase command voltage Vwtar, which are command voltages in the respective phases, based on the d-axis command voltage Vdtar, the q-axis command voltage Vqtar, and the electrical angle θ. The command voltages in the respective phases calculated by the command voltage two-phase/three-phase converter 15 are input to a switching signal generation unit 16.

The switching signal generation unit 16 receives the U-phase command voltage Vutar, the V-phase command voltage Vvtar, and the W-phase command voltage Vwtar calculated by the command voltage two-phase/three-phase converter 15 and the detection voltage detected by the voltage sensor 32. Then, the switching signal generation unit 16 generates switching signals for executing switching control of the respective switching elements 3Q1 to 3Q6 of the inverter 30 based on those received signals.

The switching signals generated by the switching signal generation unit 16 are input to the inverter 30. The MCU 1 executes the switching control based on the switching signals through such a series of operations so as to operate the respective switching elements 3Q1 to 3Q6 included in the inverter 30, to thereby supply the AC power in accordance with the command torque Ttar to the electric motor A.

The disconnection detection unit 17 receives the command torque Ttar calculated by the VEH-CU 100, the d-axis command current Idtar and the q-axis command current Iqtar calculated by the command current calculation unit 11, the electrical angle θ calculated by the rotation angle processing unit 12, the rotational speed Nm, and a U-phase current Iuact, a V-phase current Ivact, and a W-phase current Iwact, which are detection currents in the respective phases of the electric motor 4.

Then, the disconnection detection unit 17 executes the disconnection detection for the AC cables configured to connect the inverter 30 and the electric motor A to each other based on those received signals. Disconnection detection processing executed by the disconnection detection unit 17 is a main technical feature of the present invention. Thus, referring to FIG. 3 to FIG. 6, a detailed description is given of the disconnection detection processing.

Figure 3:
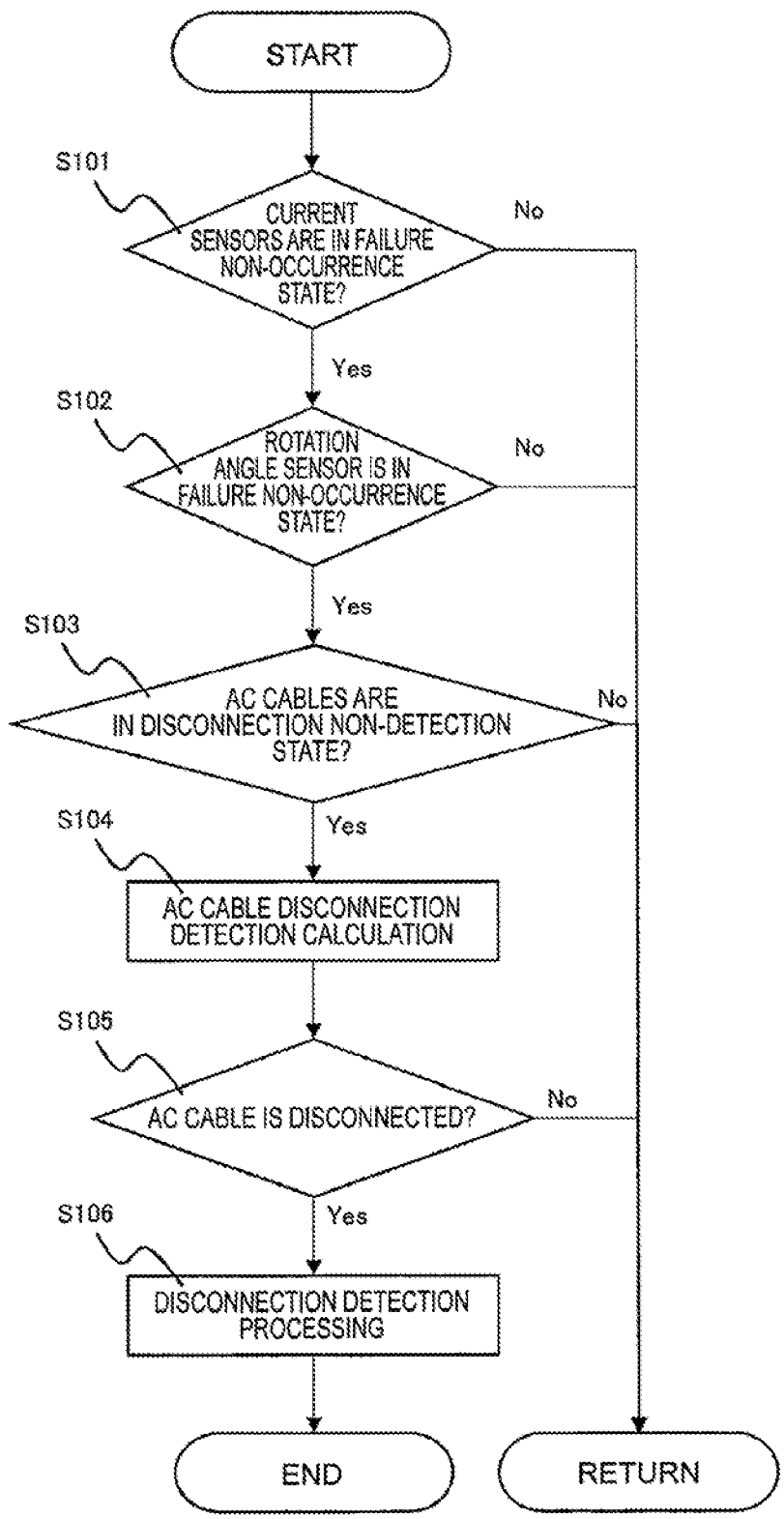
FIG. 3 is a flowchart for illustrating a main flow of AC cable disconnection detection processing executed by a disconnection detection unit in the first embodiment of the present invention.

FIG. 3 is a flowchart for illustrating a main flow of AC cable disconnection detection processing executed by the disconnect ion detection unit 17 in the first embodiment of the present invention. In the flowchart illustrated in FIG. 3, there is illustrated calculation processing executed by the MCU 1 at a constant cycle. A specific example of the constant cycle is 10 ms.

First, in Step S101, the disconnection detection unit 17 determines whether or not the U-phase current sensor 33, the V-phase current sensor 34, and the W-phase current sensor 35 attached to the AC cables configured to connect the inverter 30 and the electric motor 4 to each other are in a failure non-occurrence state.

In the first embodiment, the disconnection detection processing is executed based on the values of current flowing through the electric motor 4. Thus, when even any one of the current sensors 33 to 35 in the respective phases has failed, the disconnection detection processing in the first embodiment cannot properly be executed, and an erroneous determination may be made. Thus, in Step S101, the disconnection detection unit 17 examines whether or not the current sensors 33 to 35 in the respective phases are in the failure non-occurrence state.

When a determination of "Yes" is made in Step S101, that is, when a failure does not occur in the current sensors 33 to 35 in the respective phases, the processing proceeds to Step S102. Meanwhile, when a determination of "No" is made, the disconnection detection for the AC cables is not executed, and the series of processing procedures is finished.

When the processing proceeds to Step S102, the disconnection detection unit 17 determines whether or not the rotation angle sensor 5 is in a failure non-occurrence state. In the first embodiment, the electrical angle θ of the electric motor 4 is used for the disconnection detection processing for the AC cables. Thus, when the electrical angle θ cannot be calculated, the disconnection detection processing for the AC cables cannot be executed. Thus, in Step S102, the disconnection detection unit 17 examines whether or not the rotation angle sensor 5 is in a failure non-occurrence state.

When a determination of "Yes" is made in Step S102, that is, when a failure does not occur in the rotation angle sensor 5, the processing proceeds to Step S103. Meanwhile, when a determination of "No" is made, the disconnection detection for the AC cables is not executed, and the series of processing procedures is finished.

When the processing proceeds to Step S103, the disconnection detection unit 17 determines whether or not the disconnection of the AC cables is in a non-detection state. This determination is executed in order to avoid a state in which the disconnection detection processing is executed again after a disconnection of the AC cable has already been detected. Specifically, when disconnection detection information F_discon described later is 0, the disconnection detection unit 17 makes a determination of "Yes".

When a determination of "Yes" is made in Step S103, that is, when the disconnection of the AC cables has not been detected, the processing proceeds to Step S104. Meanwhile, when a determination of "No" is made, that is, the disconnection of the AC cable has already been detected, the disconnection detection for the AC cables is not executed, and the series of processing procedures is finished.

Figure 4:
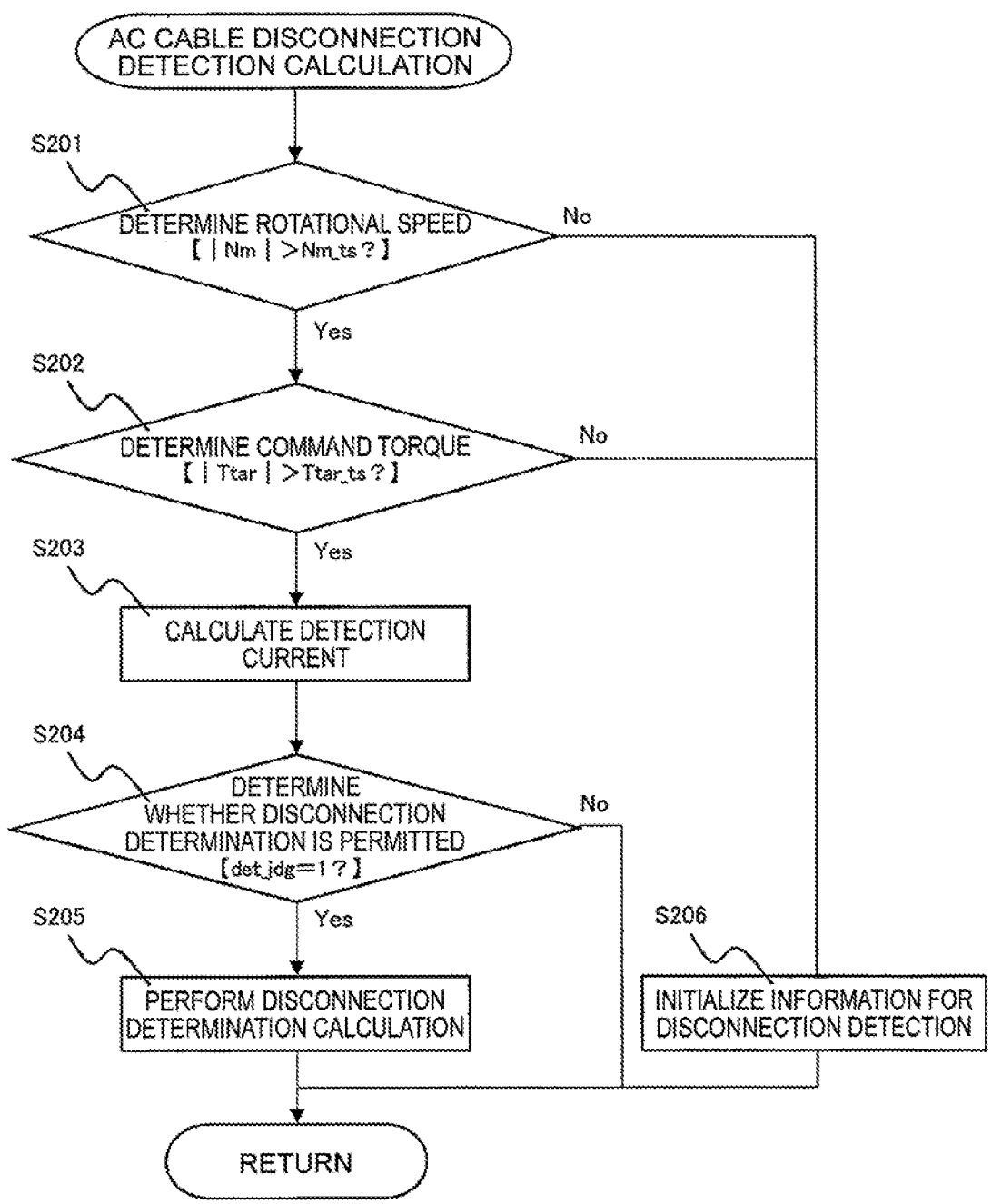
FIG. 4 is a flowchart for illustrating a flow of AC cable disconnection detection calculation processing executed by the disconnect ion detection unit in the first embodiment of the present invention.

When the processing proceeds to Step S104, the disconnection detection unit 17 executes AC cable disconnection detection calculation. Specific details of processing of the AC cable disconnection detection calculation correspond to a flowchart of FIG. 4. A detailed description of FIG. 4 is given later. When the disconnection detection unit 17 detects that the AC cable is disconnected, the disconnection detection unit 17 sets 1 for the disconnection detection information F_discon. When the disconnection detection unit 17 detects that the AC cables are not disconnected, the disconnection detection unit 17 sets 0 for the disconnection detection information F_discon.

When the AC cable disconnection detection calculation is completed in Step S104, the processing proceeds to Step S105, and the disconnection detection unit 17 determines whether or not the AC cable disconnection has been detected. This determination is made through use of the above-mentioned disconnection detection information F_discon. When the disconnection detection unit 17 has detected the disconnection, that is, when the disconnection detection information F_discon is 1, a determination of "Yes" is made, and the processing proceeds to Step S106. When a determination of "No" is made, the series of processing procedures is finished.

When the disconnection detection unit 17 detects the disconnection of the AC cable, and thus the processing proceeds to Step S106, the disconnection detection unit 17 outputs a disconnection detection signal to the switching signal generation unit 16 as the disconnection detection processing, and the series of processing procedures is finished.

When the switching signal generation unit 16 receives the disconnection detection signal from the disconnection detection unit 17, the switching signal generation unit 16 can execute, for example, processing of stopping the drive of the switching elements.

A description is now given of the flowchart of the AC cable disconnection detection calculation illustrated in FIG. 4. FIG. 4 is a flowchart for illustrating the flow of the AC cable disconnection detection calculation processing to be executed by the disconnection detection unit 17 in the first embodiment of the present invention. More specifically, the flowchart of FIG. 4 corresponds to an illustration of a series of specific processing procedures to be executed in Step S104 of FIG. 3.

In Step S201, the disconnection detection unit 17 determines a magnitude of the rotational speed Nm. The AC currents flow through the electric motor 4 illustrated in FIG. 1. Therefore, the current flowing in each phase passes through 0 A. Thus, there exists a phase in which the current does not flow depending on a stop position of the electric motor 4, namely, the electrical angle in the stop state.

Therefore, such an erroneous detection that the disconnection exists in the phase in which the current does not flow is avoided by the determination of the rotational speed in Step S201.

Specifically, in Step S201, the disconnection detection unit 17 determines whether or not the absolute value of the rotational speed Nm of the electric motor 4 is larger than a rotational speed determination value Nm_ts. In this case, as an example, 50 r/min is set in advance as the rotational speed determination value Nm_ts.

When a determination of "Yes" is made in Step S201, that is, when a relationship of |Nm|>Nm_ts is established, the processing proceeds to Step S202. Meanwhile, when a determination of "No" is made, that is, when the relationship of |Nm|>Nm_ts is not established, the processing proceeds to Step S206.

When the processing proceeds to Step S202, the disconnection detection unit 17 determines a magnitude of the command torque Ttar. When the command torque Ttar is 0 Km, the current does not flow through the electric motor 4. Thus, it is not required to detect the disconnection of the AC cables. For that purpose, the determination in Step S202 is provided.

Specifically, in Step S202, the disconnection detection unit 17 determines whether or not the absolute value of the command torque Ttar is larger than a command torque determination value Ttar_ts. In this case, as an example, 10 Nm is set in advance as the command torque determination value Ttar_ts.

When a determination of "Yes" is made in Step S202, that is, when a relationship of |Ttar|>Ttar_ts is established, the processing proceeds to Step S203. Meanwhile, when a determination of "No" is made, that is, when the relationship of |Ttar|>Ttar_ts not established, the processing proceeds to Step S206.

Figure 5:
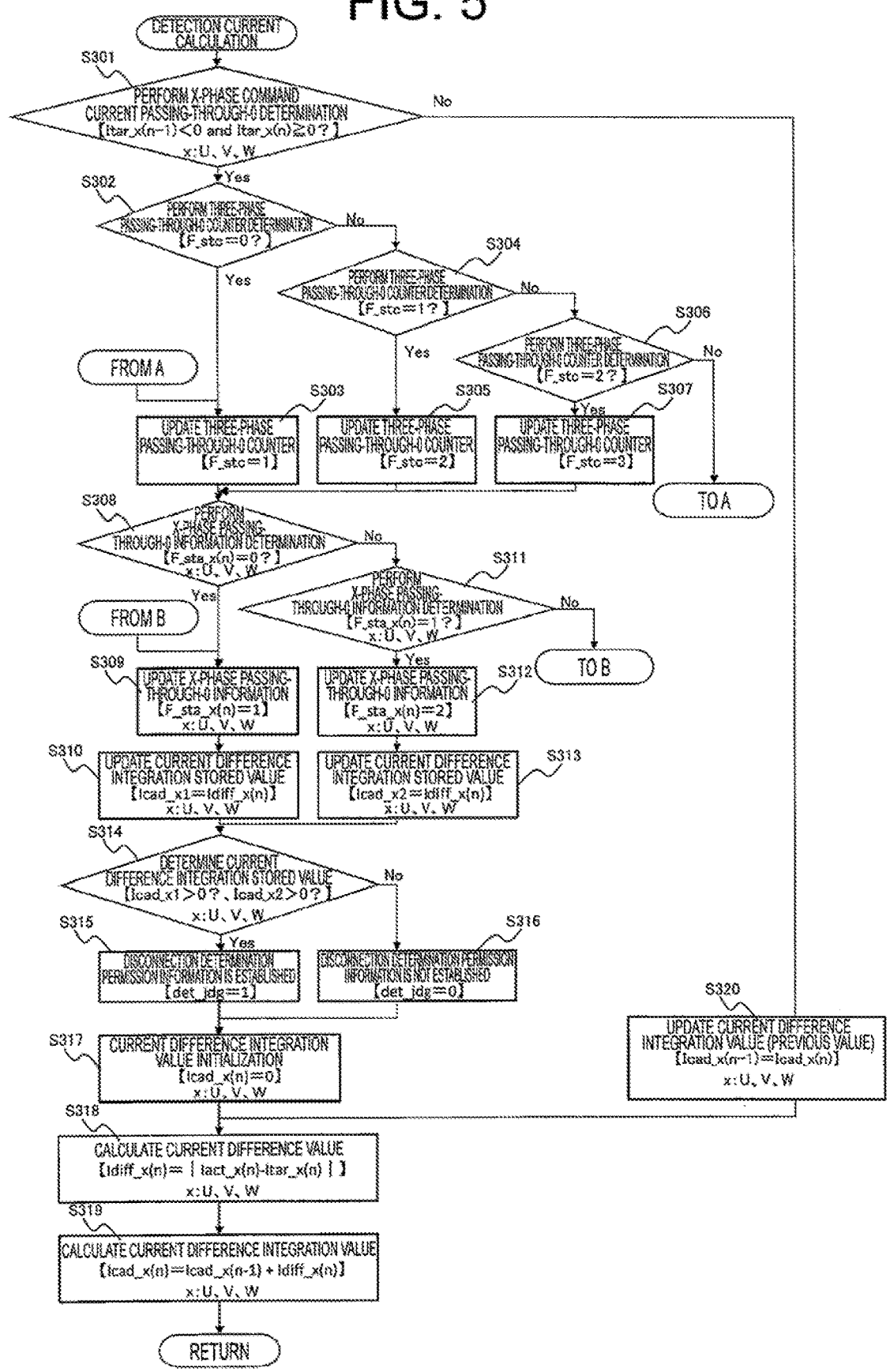
FIG. 5 is a flowchart for illustrating a flow of detection current calculation processing executed by the disconnection detection unit in the first embodiment of the present invention.

When the processing proceeds to Step S203, the disconnection detection unit 17 executes detection current calculation. Specific details of processing of the detection current calculation correspond to a flowchart illustrated in FIG. 5. A detailed description of FIG. 5 is given later. When the disconnection detection unit 17 determines that a condition under which the disconnection determination can be made is satisfied, the disconnection detection unit 17 sets 1 for a disconnection determination permission flag det_jdg. When the disconnect ion detection unit 17 determines that the condition under which the disconnection determination can be made is not satisfied, the disconnection detection unit 17 sets 0 for the disconnection determination permission flag det_jdg.

When the detection current calculation is completed in Step S203, the processing proceeds to Step S204, and the disconnection detection unit 17 determines whether or not the condition under which the disconnection determination can be made is satisfied. This determination is made through use of the above-mentioned disconnection determination permission flag det_jdg. When the disconnection detection unit 17 has completed the calculation of the information to be used for the disconnection determination and has thus determined that the condition under which the disconnection determination can be made is satisfied, and consequently the disconnection determination permission flag det_jdg is 1, the disconnection detection unit 17 makes a determination of "Yes", and the processing proceeds to Step S205. Meanwhile, when the calculation of the information to be used for the disconnection determination has not been completed and a determination of "No" is made, the series of processing procedures of FIG. 4 is finished. Then, the processing returns to the processing of FIG. 3, and Step S105 and the subsequent steps are executed.

Figure 6:
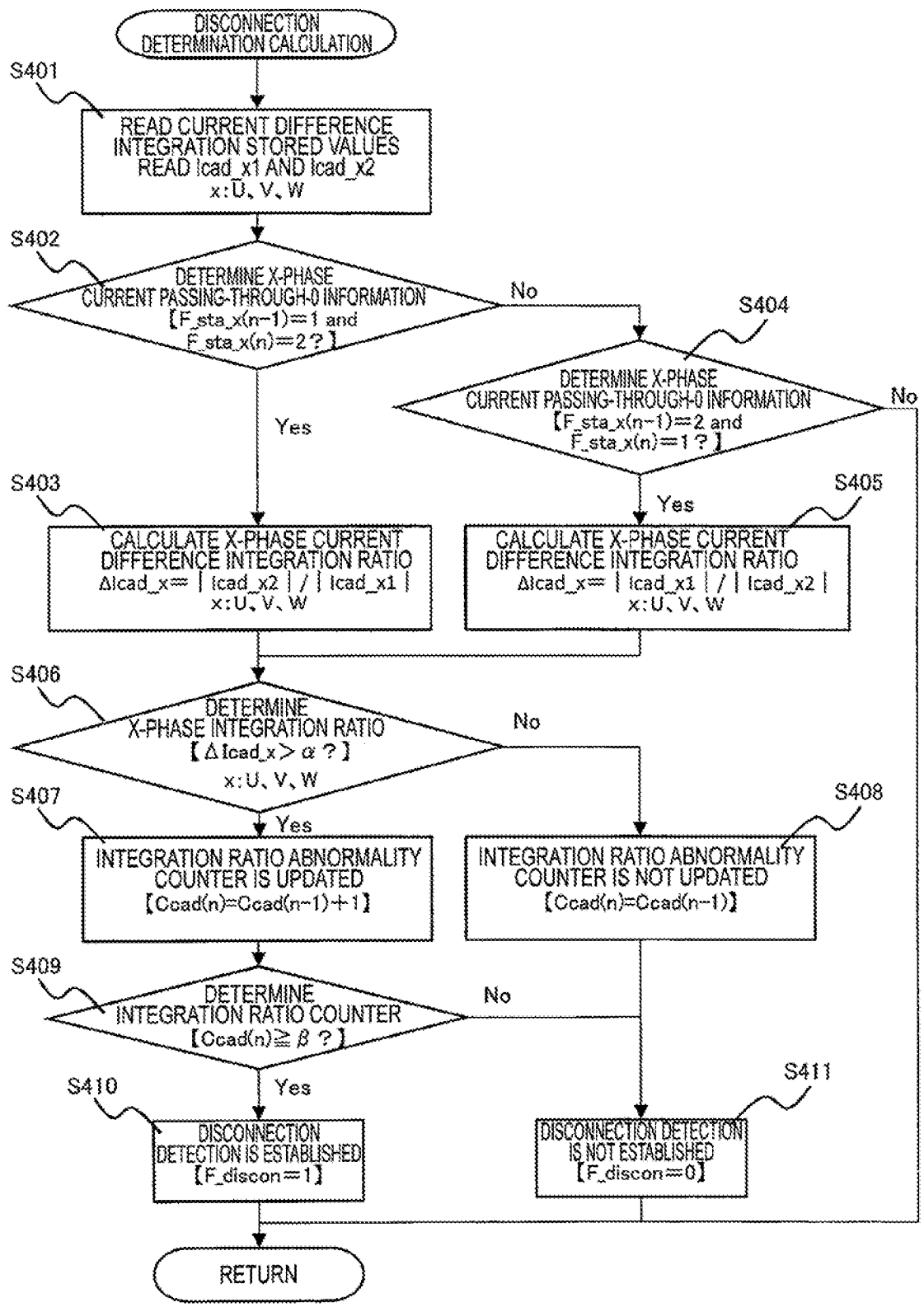
FIG. 6 is a flowchart for illustrating a flow of disconnection determination calculation processing executed by the disconnection detection unit in the first embodiment of the present invention.

When the processing proceeds to Step S205, the disconnection detection unit 17 executes disconnection determination calculation. Specific details of processing of the disconnection determination calculation correspond to a flowchart illustrated in FIG. 6. A detailed description of FIG. 6 is given later. When the disconnection detection unit 17 detects the disconnection, the disconnection detection unit 17 sets 1 for the disconnection detection information F_discon. When the disconnection detection unit 17 does not detect the disconnection, the disconnection detection unit 17 sets 0 for the disconnection detection information F_discon.

Moreover, when the processing proceeds from Step S201 or Step S202 to Step S206, the disconnection detection unit 17 initializes various types of information to be used in the disconnection detection. Then, the series of processing procedures of FIG. 4 is finished, and the processing returns to the processing of FIG. 3, and Step S205 and the subsequent steps are executed.

A description is now given of a flowchart of the detection current calculation illustrated in FIG. 5. FIG. 5 is the flowchart for illustrating a flow of the detection current calculation processing to be executed by the disconnection detection unit 17 in the first embodiment of the present invention. More specifically, the flowchart of FIG. 5 corresponds to an illustration of a series of specific processing procedures to be executed in Step S203 of FIG. 4. The detection current calculation processing of FIG. 5 is executed in each phase, and is executed at a cycle shorter than that of FIG. 3, for example, at 100 psec.

In Step S301, the disconnection detection unit 17 executes a passing-through-0 A determination of a command current Itar_x (x: U, V, W) in each phase. The disconnection detection unit 17 uses the d-axis command current Idtar, the q-axis command current Iqtar, and the electrical angle θ so as to calculate the command current in each phase. Further, the disconnection detection unit 17 uses a previous value Itar_x(n−1) (x: U, V, W) and the current value (n) (x: U, V, W) in each phase so as to execute the passing-through-0 A determination.

More specifically, the disconnection detection unit 17 determines that the passing-through-0 A has occurred when the following expressions are established in each phase.

$$Itar\_x(n-1)<0, \text{ and}$$

$$Itar\_x(n) \geq 0 \ (x: U,V,W)$$

When the disconnection detection unit 17 determines that the command current Itar_x (x: U, V, W) has passed through 0 A in the current cycle in Step S301, a determination of 'Yes' is made, and the processing proceeds to Step S302. Meanwhile, when a determination of "No" is made, the processing proceeds to Step S320.

When the processing proceeds to Step S320, the disconnection detection unit 17 updates a current difference integration value (previous value) Iead_x(n−1) (x: U, V, W), and the processing proceeds to Step S318. Then, in Step S318, the disconnection detection unit 17 calculates a current difference value Idiff_x (x: U, V, W) as the absolute value of a difference between the command current Itar_x (x: U, V, W) and a detection current Iact_x (x: U, V, W) in each phase. Then, in Step S319, the disconnection detection unit 17 uses the following expression so as to calculate a current difference integration value Icad_x(n) (x: U, V, W), and then finishes the series of processing procedures.

$$Icad\_x(n)=Icad\_x(n-1)+Idiff\_x(n)$$

When the processing proceeds from Step S301 to Step S302, the disconnection detection unit 17 determines whether or not a three-phase passing-through-0 counter F_stc is 0. This three-phase passing-through-0 counter F_stc is a counter to be counted up in each cycle in which the current flowing in any one of the phases passes through 0 A. When the number of phases of the electric motor 4 is three as in the first embodiment, the three-phase passing-through-0 counter cyclically operates in a range of from 0 to 3.

When a determination of "Yes" is made in Step S302, that is, the three-phase passing-through-0 counter F_stc is 0, the condition that the current flowing through the electric motor 4 passes through 0 A is satisfied for the first time after the AC cable disconnection detection calculation of FIG. 4 was started. When a determination of "Yes" is made in Step S302, the processing proceeds to Step S303. Then, the disconnection detection unit 17 counts up the three-phase passing-through-0 counter F_stc so as to become 1, and the processing proceeds to Step S308.

Meanwhile, when a determination of "No" is made in Step S302, that is, when the three-phase passing-through-0 counter F_stc is other than 0, the processing proceeds to Step S304, and the disconnection detection unit 17 determines whether or not the three-phase passing-through-0 counter F_stc is 1.

When a determination of "Yes" is made in Step S304, that is, when the three-phase passing-through-0 counter F_stc is 1, the processing proceeds to Step S305. Then, the disconnection detection unit 17 counts up the three-phase passing-through-0 counter F_stc so as to become 2, and the processing proceeds to Step S308.

Meanwhile, when a determination of "No" is made in Step S304, that is, when the three-phase passing-through-0 counter F_stc is other than 1, the processing proceeds to Step S306, and the disconnection detection unit 17 determines whether or not the three-phase passing-through-0 counter F_stc is 2.

When a determination of "Yes" is made in Step S306, that is, when the three-phase passing-through-0 counter F_stc is 2, the processing proceeds to Step S307. Then, the disconnection detection unit 17 counts up the three-phase passing-through-0 counter F_stc so as to become 3, and the processing proceeds to Step S306.

Meanwhile, when a determination of "No" is made in Step S306, the passing-through-0 has been detected in all of the three phases, which corresponds to a state in which the three-phase passing-through-0 counter F_stc is 3, and thus the processing proceeds to Step S303. Then, the disconnection detection unit 17 resets the three-phase passing-through-0 counter F_stc to 1, and the processing proceeds to Step S308.

When the processing proceeds to Step S308, the disconnection detection unit 17 determines whether or not passing-through-0 information F_sta_x (x: U, V, W) in each phase is 0. This passing-through-0 information F_sta_x (x: U, V, W) is a counter to be counted up each time the disconnection detection unit 17 passes through Step S309 or Step S312, which are described later, and thus cyclically operates in a range of between 1 and 2.

In Step S306, when a determination of "Yes" is made, the processing proceeds to Step S309. Then, the disconnection detection unit 17 updates the passing-through-0 information F_sta_x (x: U, V, W) to 1, and the processing proceeds to Step S310. Subsequently, in Step S310, the disconnection detection unit 17 updates a current difference integration stored value Icad_x1 (x: U, V, W) as given by the following expression, and the processing proceeds to Step S314.

$$Icad\_x1=Idiff\_x(n) \ (x: U,V,W)$$

Meanwhile, when a determination of "No" is made in Step S308, the processing proceeds to Step S311, and the disconnection detection unit 17 determines whether or not the passing-through-0 information F_sta_x (x: U, V, W) is 1. In Step S311, when a determination of "Yes" is made, the processing proceeds to Step S312. Then, the disconnection detection unit 17 updates the passing-through-0 information F_sta_x (x: U, V, W) to 2, and the processing proceeds to Step S313. Subsequently, in Step S313, the disconnection detection unit 17 updates a current difference integration stored value Icad_x2 (x: U, V, W) as given by the following expression, and the processing proceeds to Step S314.

$$Icad\_x2 = Idiff\_x(n) \ (x: U, V, W)$$

Meanwhile, when a determination of "No" is made in Step S311, the processing proceeds to Step S309, and the disconnection detection unit 17 updates the passing-through-0 information F_sta_x (x: U, V, W) to 1. The disconnection detection unit 17 then executes the processing in Step S310 described above, and the processing proceeds to Step S314.

When the processing proceeds to Step S314, the disconnection detection unit 17 makes a determination based on the two current difference integration stored values Icad_x1 and Icad_x2 (x: U, V, W). This determination is a determination of whether a condition for starting the disconnection determination calculation described later has been satisfied. Specifically, the disconnection detection unit 17 determines whether or not the calculation of the current difference integration stored values Icad_x1 and Icad_x2 (x: U, V, W) based on the command and the detection current value in each phase (U, V, W) has been completed based on whether or not a condition given by the following expression is satisfied.

$$Icad\_x1 > 0 \text{ and } Icad\_x2 > 0 \ (x: U, V, W)$$

When a determination of "Yes" is made in Step S314, that is, when the condition given by the above-mentioned expression is satisfied and the calculation of the current difference integration stored values Icad_x1 and Icad_x2 (x: U, V, W) in each phase has been completed, the processing proceeds to Step S315. Then, in Step S315, the disconnection detection unit 17 sets the disconnection determination permission flag det_jdg to 1, and the processing proceeds to Step S317.

Meanwhile, when a determination of "No" is made in Step S314, that is, when the condition given by the above-mentioned expression is not satisfied and the calculation of the current difference integration stored values Icad_x1 and Icad_x2 (x: U, V, W) in each phase has not been completed, the processing proceeds to Step S316. Then, in Step S316, the disconnection detection unit 17 sets the disconnection determination permission flag det_jdg to 0, and the processing proceeds to Step S317.

When the processing proceeds to Step S317, the disconnection detection unit 27 initializes the current difference integration value Icad_x(n) (x: U, V, W) to 0, and the processing proceeds to Step S318. Then, in Step S318, the disconnection detection unit 17 calculates the current difference value Idiff_x (x: U, V, W) as the absolute value of the difference between the command current. Itar_x (x: U, V, W) and the detection current Iact_x (x: U, V, W) in each phase as described above, and the processing proceeds to Step S319.

Then, in Step S319, the disconnection detection unit 17 adds the current difference value Idiff_x(n) (x: U, V, W) calculated in Step S318 to the current difference integration value (previous value) Icad_x(n−1) (x: U, V, W), to thereby calculate the current difference integration value (current value) Icad_x(n) (x: U, V, W) as described above, and finishes the series of processing procedures.

A description is now given of the flowchart of the disconnection determination calculation illustrated in FIG. 6. FIG. 6 is a flowchart for illustrating a flow of the disconnection determination calculation processing to be executed by the disconnection detection unit 17 in the first embodiment of the present invention. More specifically, the flowchart of FIG. 6 corresponds to an illustration of a series of specific processing procedures to be executed in Step S205 of FIG. 4.

In Step S401, the disconnection detection unit 17 reads the current-difference integration stored values Icad_x1 and Icad_x2 (x: U, V, W), and the processing proceeds to Step S402. Then, in Step S402, the disconnection detection unit 17 determines the passing-through-0 information F_sta_x (x: U, V, W) in each phase. This determination is made to determine a calculation expression to be used for ratio calculation of the current difference integration values described later.

In Step S402, the disconnection detection unit 17 determines whether or not the current value of the passing-through-0 information F_sta_x (x: U, V, W) is 2, and the previous value thereof is 1. When a determination of "Yes" is made in Step S402, the processing proceeds to Step S403. When the processing proceeds to Step S403, the current difference integration stored value Icad_x1 (x: U, V, W) is the previous value, and the disconnection detection unit 17 calculates a current difference integration ratio ΔIcad_x (x: U, V, W) as given by the following expression, and the processing proceeds to Step S406.

$$\Delta Icad\_x = |Icad\_x2|/|Icad\_x1| \ (x: U, V, W)$$

Meanwhile, when a determination of "No" is made in Step S402, the processing proceeds to Step S404. Then, in Step S404, the disconnection detection unit 17 determines whether or not the current value of the passing-through-0 information F_sta_x (x: U, V, W) is 1, and the previous value thereof is 2. When a determination of "Yes" is made in Step S404, the processing proceeds to Step S405. When the processing proceeds to Step S405, the current difference integration stored value Icad_x2 (x: U, V, W) is the previous value, and the disconnection detection unit 17 calculates the current difference integration ratio ΔIcad_x (x: U, V, W) as given by the following expression, and the processing proceeds to Step S406.

$$\Delta Icad\_x = |Icad\_x1|/|Icad\_x2| \ (x: U, V, W)$$

When the processing proceeds to Step S406, the disconnection detection unit 17 determines whether or not the current difference integration ratio ΔIcad_x (x: U, V, W) calculated in Step S403 or Step S405 is larger than a determination value α.

When the disconnection has not occurred in the AC cables configured to connect the power conversion device 30 and the electric motor 4 to each other, a large difference does not occur between the command current Itar_x (x: U, V, W) and the detection current Iact_x (x: U, V, W) in each phase. However, when the AC cable is disconnected, the current detection cannot be executed, and the detection current is 0 A. Thus, a difference occurs between the command current and the detection current.

It should be noted that the command current Itar_x (x: U, V, W) is an ideal value, aria the detection current Iact_x (x: U, V, W) is an actual current that flows as a result of the application of the PWM control or the like. Thus, a certain amount of difference occurs between the command current and the detection current even when the disconnection does not occur in the AC cables. Therefore, the determination in Step S406 is provided so as to avoid the erroneous determination of the AC cable disconnection.

The determination value α for the current difference integration ratio to be used in Step S406 is set to such a value that the erroneous determination is not made by the disconnection detection unit 17 even when a maximum current change occurs in the electric motor 4. For example, 1.1 is set for this determination value α so that the disconnection determination is not made up to 1.1 times the current difference integration ratio calculated in Step S403 and Step S404.

When a determination of "Yes" is made in the in Step S406, that is, when the current difference integration ratio ΔIcad_x (x: U, V, W) is larger than the determination value α in each phase, the processing proceeds to Step S407, and the disconnection detection unit 17 counts up an integration ratio abnormality counter Ccad (n) only by one.

The integration ratio abnormality counter Ccad (n) is a sum of the determinations of the current difference integration ratio ΔIcad_x (x: U, V, W) in each phase in Step S406. When the calculation of the integration ratio abnormality counter Ccad (n) in Step S407 is finished, the processing proceeds to Step S405.

When the processing proceeds to Step S409, the disconnection detection unit 17 determines whether or not the integration ratio abnormality counter Ccad (n) is equal to or larger than a determination value β. As described above, the integration ratio abnormality counter Ccad (n) is the sum of the abnormal states in the respective phases. Thus, in Step S403, the disconnection detection unit 17 determines that the AC cable is disconnected when the integration ratio abnormality counter Ccad (n) corresponding to the abnormal states in the entire phases is equal to or larger than the determination value β, which is a number of times set in advance. The determination value β is set to 6, which corresponds to two cycles of the respective phases.

In Step S409, when the integration ratio abnormality counter Ccad (n) is equal to or larger than the determination value β, a determination of "Yes" is made, and the processing proceeds to Step S410. Then, in Step S410, the disconnection detection unit 17 sets the disconnection detection information F_discon to 1, and finishes the series of processing procedures of FIG. 6. Meanwhile, in Step S409, when the integration ratio abnormality counter Ccad (n) is smaller than the determination value β, a determination of "No" is made, and the processing proceeds to Step S411.

Meanwhile, when a determination of "No" is made in Step S406, that is, when the current difference integration ratio ΔIcad_x (x: U, V, W) in each phase is equal to or smaller than the determination value α, the processing proceeds to Step S408. Then, in Step S408, the processing proceeds to Step S411 without the disconnection detection unit 17 updating the integration ratio abnormality counter Ccad (n).

Then, when the processing proceeds from Step S408 or Step S409 to Step S411, the disconnection detection unit 17 sets the disconnection detection information F_discon to 0, and finishes the series of processing procedures of FIG. 6.

Meanwhile, when a determination of "No" is made in Step S404, the series of processing procedures of FIG. 6 is finished without executing the disconnection determination calculation.

Figure 7:
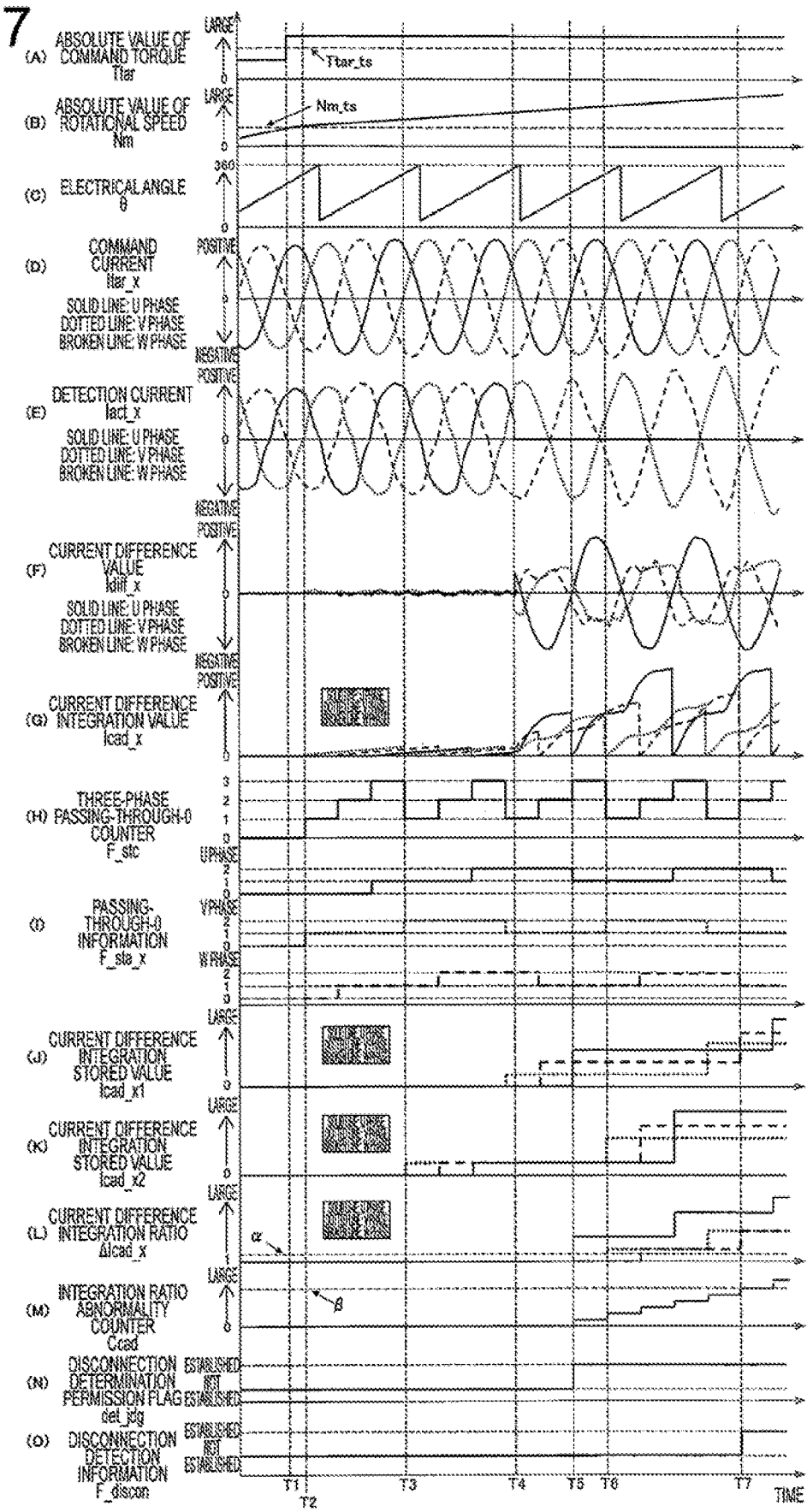
FIG. 7 is a timing chart for showing an operation of AC cable disconnection detection in the first embodiment of the present invention.

Referring to a time chart, a description is now given of the disconnection detection processing to be executed in the control device for an electric motor according to the first embodiment. FIG. 7 is a timing chart for showing an operation of the AC cable disconnection detection in the first embodiment of the present invention. In FIG. 7, the horizontal axis indicates time, and the vertical axes indicate the following values in order from the top. A symbol x indicates U, V, or W.

(A) Absolute value of command torque Ttar
(B) Absolute value of rotational speed Nm
(C) Electrical angle θ
(D) Command current Itar_x
(E) Detection current Iact_x
(F) Current difference value Idiff_x
(G) Current difference integration value Icad_x
(H) Three-phase passing-through-0 counter F_stc
(I) Passing-through-0 information F_sta_x
(J) Current, difference integration stored value Icad_x1
(K) Current difference integration stored value Icad_x2
(L) Current difference integration ratio ΔIcad_x
(M) Integration ratio abnormality counter Ccad
(N) Disconnection determination permission flag det_jdg
(O) Disconnection detection information F_discon First, at a time T1, the absolute value (A) of the command torque Ttar changes so as to exceed the command torque determination value Ttar_ts. Then, the absolute value (B) of the rotational speed Nm exceeds the rotational speed determination value Nm_ts. As a result, the detection current calculation routine described with reference to FIG. 5 is started.

Then, at a time T2, the V-phase command current Itar_v (D) passes through 0 A, the three-phase passing-through-0 counter F_stc (H) is thus counted up by one, and the passing-through-0 information in the V phase F_sta_v (I) is also counted up only by one. Then, the calculation of the V-phase current difference value Idiff_v (F) is started.

The calculation of the V-phase current difference value Idiff_v (F) is the difference value obtained by subtracting the V-phase command current Itar_v (D) from the V-phase detection current Iact_v (E). The difference value becomes extremely small when the AC cable is not disconnected. When the V-phase current difference value Idiff_v (F) is calculated, then, the V-phase current difference integration value Icad_v (G) is calculated.

Then, when the W-phase command current Itar_w passes through 0 A, the three-phase passing-through-0 counter F_stc (H) is counted up by one (F_stc (H)=2). When the U-phase command current Itar_u also passes through 0 A, the three-phase passing-through-0 counter Fstc (H) is counted up by one (F_stc (H)=3). As a result, the current calculation is started also in the W phase as in the V phase.

This three-phase passing-through-0 counter F_stc (H) changes each time the passing-through-0 determination in each phase is affirmatively made in Step S301 of FIG. 5. The three-phase passing-through-0 counter F_stc (H) changes up to the number of the phases of the electric motor 4, and returns to 1 after reaching the number of the phases. Moreover, the three-phase passing-through-0 counter F_stc (H) is initialized to 0 when the rotational speed determination is the determination of "No" in Step S201 of FIG. 4 or when the command torque determination is the determination of "No" in Step S202 of FIG. 4.

Moreover, the passing-through-0 information F_sta_x (I) also changes when the command current Itar_x (D) in each phase passes through 0 A. The passing-through-0 information F_sta_x (I) takes the value of 1 or 2 when the x-phase command current Itar_x passes through 0 A. Moreover, the passing-through-0 information F_sta_x (I) is initialized to 0 when the rotational speed determination is the determination of "No" in Step S201 of FIG. 4 or when the command torque determination is the determination of "No" in Step S202 of FIG. 4.

At a time T3, the V-phase command current Itar_v (D) again passes through 0 A, and the command current passing-through-0 determination is thus affirmatively made in Step S301 of FIG. 5. At the time T3, the command currents have also at least once passed through 0 A in the other phases (W phase and U phase), and the command current passing-through-0 determination is thus affirmatively made in Step S301 of FIG. 5. Thus, the three-phase passing-through-0 counter F_stc (H) is 3, and the three-phase passing-through-0 counter thus changes from 3 to 1 at the time T3.

Moreover, the passing-through-0 information F_sta_v (I) in the V-phase changes from 1 to 2 at the time T3. Then, the V-phase current difference integration value Icad_v (G), which has been calculated since the time T2, is stored as the current difference integration stored value Icad_v2 (K), and is then initialized to 0.

Then, immediately before a time T4, when the V-phase command current Itar_v (D) again passes through 0 A and the command current passing-through-0 determination is affirmatively made in Step S301 of FIG. 5, the three-phase passing-through-0 counter F_stc (H) changes from 3 to 1 as at the time T3.

It should be noted that the passing-through-0 information F_sta_v (I) in the V phase changes from 2 to 1, and the value of the current difference integration value Icad_v (G) is stored as the current difference integration stored value Icad_v1 (K), and is then initialized to 0. Moreover, the calculation is executed also in the W phase and the U phase, which are the other phases, as in the V phase.

At the time T4, when the AC cable is disconnected in the U phase, the three-phase detection current Iact_u (E) becomes 0 A, but the command current Itar_u (D) does not become 0 A. Therefore, the current difference value Idiff_u (F) rapidly changes, and an increase amount of the current difference integration value Icad_u (G) also increases. Moreover, the change amounts of the detection currents Iact_v and Iact_w (E) in the V phase and the W phase, which are the other phases, also increase under the influence of the U phase, and increase amounts of the current difference integration values Icad_v and Icad_w (G) increase.

At a time T5, at which second integration calculation for the U-phase current is completed, the integration calculation has been completed two or more times in all of the phases (U, V, W). Thus, at the time T5, the disconnection determination permission flag det_jdg (N) is established, the disconnection determination calculation routine described with reference to FIG. 6 is started, and the current difference integration ratio ΔIcad_x (L) is calculated based on the passing-through-0 information F_sta_x (x: U, V, W).

In FIG. 7, the time T5 at which the disconnection determination permission flag det_jdg (N) is established corresponds to a timing at which the passing-through-0 information F_sta_u (I) in the U phase changes. Thus, calculation information in the U phase is used for the calculation of the current difference integration ratio ΔIcad_x (L).

At the time T5, the passing-through-0 information F_sta_u (I) in the U phase changes from 2 to 1. Thus, the expression described in Step S405 is used to calculate the current difference integration ratio ΔIcad_u (L). Then, the calculated value of the current difference integration ratio ΔIcad_u (L) is equal to or larger than the determination value α, and the integration ratio abnormality counter Ccad (M) is thus counted up by one.

Then, when the V-phase command current Itar_v (D) passes through 0 A at a time T6, the passing-through-0 information F_sta_v (I) in the V phase changes from 1 to 2. Thus, the current difference integration ratio ΔIcad_v (L) is calculated through use of the expression described in Step S403, and is compared with the determination value α. The current difference integration ratio ΔIcad_v (L) in the V phase is also larger than the determination value α, and the integration ratio abnormality counter Ccad (M) is counted up by one.

Subsequently, the W-phase command current Itar_w (D) passes through 0 A, and the passing-through-0 information F_sta_w (I) in the W phase changes from 1 to 2. Then, as in the V-phase calculation described above, the current difference integration ratio ΔIcad_w (L) is calculated through use of the expression described in Step S403, and is compared with the determination value α. The current difference integration ratio ΔIcad_w (L) in the W phase is also larger than the determination value α, and the integration ratio abnormality counter Ccad (M) is counted up by one.

In this manner, after the disconnection determination permission flag det_jdg (N) is established, the passing-through-0 information F_sta_x (x: U, V, W) (I) in each phase changes each time the command current Itar_x (x: U, V, W) (D) in each phase passes through 0 A. Then, the current difference integration ratio ΔIcad_x (x: U, V, W) (L) is successively calculated as given by the expression described in Step S403 or the expression described in Step S405 based on the change in the passing-through-0 information F_sta_x (x: U, V, W) (I) in each phase, and is compared with the determination value α, and the integration ratio abnormality counter Ccad (M) is counted up.

Then, the W-phase command current Itar_w (D) passes through 0 A at a time T7, and the current difference integration ratio ΔIcad_w (L) is calculated. Then, the calculated current difference integration ratio ΔIcad_w (L) becomes larger than the determination value α, and the integration ratio abnormality counter Ccad (M) is counted up. Further, the integration ratio abnormality counter Ccad (M) becomes equal to or larger than the determination value β, and the disconnection detection information F_discon (O) is thus established, and is set to 1.

As described above, the first embodiment has the configuration in which the disconnection of the AC cables is detected based on the transition result of the difference value between the current command value and the current detection value of the electric motor. With this configuration, even when the disconnection occurs in the AC cable configured to connect the inverter and the electric motor to each other, the disconnection can quickly be detected.

Further, when the disconnection is detected, the driving of the switching elements forming the inverter can immediately be stopped, and the state in which the abnormal operation of the electric motor continues can be prevented. Moreover, the electric motor mounted on a vehicle does not continue the abnormal operation, and thus generation of vehicle vibration can be suppressed. As a result, there is no fear that a driver and passengers feel discomfort.

Moreover, the disconnection detection unit in the present invention has a function of calculating the difference value between the phase current detection value and the phase current command value in each calculation cycle, and detecting the presence or the absence of the disconnection of the AC cable based on the integration value of the difference value calculated over the plurality of the calculation cycles.

Moreover, the disconnection detection unit in the present invention has a function of setting the time at which each phase current command value passes through 0 A as a calculation start point in each phase, setting the time at which the phase current command value in the phase for which the calculation has been started passes through 0 A one cycle after or a half cycle after in the electrical angle as the calculation end point, and calculating the integration value.

Moreover, the disconnection detection unit in the present invention has a function of avoiding executing the disconnection detection processing when the rotational speed is equal to or smaller than the rotational speed determination value set in advance or when the torque command is equal to or smaller than the torque command determination value set in advance.

With the above-mentioned functions, it is not required to set a determination value for the phase current so as to detect the disconnection, and it is possible to quickly execute the disconnection detection processing based on the calculation result of the integration value in one cycle or a half cycle. Further, the disconnection detection for the AC cables can reliably be executed while avoiding the disconnection detection processing in the state that may cause an erroneous determination of the disconnection detection, for example, the state in which the electric motor stops rotating.

In this embodiment, a description is given of the case in which the disconnection detection of the current flowing through in each phase of the electric motor is executed in one cycle of the electrical angle. However, the present invention is not limited to such disconnection detection. As shown in FIG. 7, the current flowing in each phase passes through 0 A every half cycle of the electrical angle. Thus, the disconnection detection for the AC cable can be executed in the half cycle.

Moreover, in the first embodiment, a description is given of the case in which the determination value for executing the disconnection detection for the AC cables is the fixed value based on the phase current flowing in each phase of the electric motor. However, the present invention is not limited to the case in which the fixed determination value is used. The determination value may variably be set in accordance with the rotational speed of the electric motor.

Moreover, in the first embodiment, a description is given of the case in which the current difference integration value in each phase is used for the disconnection determination for the AC cable. However, the present invention may use the theorem of three-phase current sum given by "U-phase current+V-phase current+W-phase current=0" so as to execute the disconnection determination.

REFERENCE SIGNS LIST

1 motor control unit (MCU), 2 battery, 4 electric motor, 5 rotation angle sensor, 11 command current calculation unit, 12 rotation angle processing unit, 13 detection current three-phase/two-phase converter, 14 command voltage calculation unit, 15 command voltage two-phase/three-phase converter, 16 switching signal generation unit, 17 disconnection detection unit, 30 inverter (power conversion device), 33 U-phase current sensor, 34 V-phase current sensor, 35 W-phase current sensor

The invention claimed is:

1. A control device for an electric motor, comprising:
a controller configured to apply switching control to a switching element, which is provided in an inverter configured to invert DC power supplied from a DC power supply to AC power, in accordance with a torque command supplied from an outside, to thereby control the AC power to be supplied to the electric motor; and
a current sensor configured to detect a phase current, which flows through an AC cable configured to connect the electric motor and the inverter to each other,
wherein the controller includes a disconnection detector configured to acquire the phase current detected by the current sensor as a phase current detection value, calculate, based on the torque command, a command current directed to the electric motor as a phase current command value, and determine presence or absence of a disconnection of the AC cable in each phase from a transition result of a difference value between the phase current command value and the phase current detection value in each phase,
wherein the disconnection detector is configured to calculate the difference value between the phase current detection value and the phase current command value in each calculation cycle, and to detect the presence or the absence of the disconnection of the AC cable based on an integration value of difference values calculated over a plurality of calculation cycles.

2. The control device for an electric motor according to claim 1, further comprising a rotation angle sensor configured to detect a rotation angle of the electric motor,
wherein the controller further includes a rotation angle processor configured to calculate an electrical angle and a rotational speed of the electric motor from the rotation angle of the electric motor, and
wherein the disconnection detector is configured to set a time at which each phase current command value passes through 0 A as a calculation start point in each phase, set a time at which the phase current command value in the phase for which the calculation has been started passes through 0 A one cycle after or a half cycle after in the electrical angle as a calculation end point, and calculate the integration value over a plurality of calculation cycles included in a period from the calculation start point to the calculation end point.

3. The control device for an electric motor according to claim 2, wherein the disconnection detector is configured to avoid executing the disconnection detection processing when an absolute value of the rotational speed calculated by the rotation angle processor is equal to or smaller than a rotational speed determination value set in advance, and initialize a calculation result calculated by the disconnection detection processing.

4. The control device for an electric motor according to claim 2, wherein the disconnection detector is configured to repeat the calculation of the integration value over the plurality of calculation cycles included in the period from the calculation start point to the calculation end point, calculate a ratio between a previous value and a current value of the integration value, and determine that the disconnection of the AC cable has occurred when a state in which the ratio is higher than a determination threshold value set in advance continues for a disconnection determination number of times determined in advance.

5. A control device for an electric motor, comprising:
a controller configured to apply switching control to a switching element, which is provided in an inverter configured to invert DC power supplied from a DC power supply to AC power, in accordance with a torque command supplied from an outside, to thereby control the AC power to be supplied to the electric motor; and a current sensor configured to detect a phase current, which flows through an AC cable configured to connect the electric motor and the inverter to each other, wherein the controller includes a disconnection detector configured to acquire the phase current detected by the current sensor as a phase current detection value, calculate, based on the torque command, a command current directed to the electric motor as a phase current command value, and determine presence or absence of a disconnection of the AC cable in each phase from a transition result of a difference value between the phase current command value and the phase current detection value in each phase, and wherein the disconnection detector is configured to avoid executing the disconnection detection processing when an absolute value of the torque command is equal to or smaller than a torque command determination value set in advance, and initialize a calculation result calculated by the disconnection detection processing.

6. A control device for an electric motor, comprising:

a controller configured to apply switching control to a switching element, which is provided in an inverter configured to invert DC power supplied from a DC power supply to AC power, in accordance with a torque command supplied from an outside, to thereby control the AC power to be supplied to the electric motor; and a current sensor configured to detect a phase current, which flows through an AC cable configured to connect the electric motor and the inverter to each other, wherein the controller includes a disconnection detector configured to acquire the phase current detected by the current sensor as a phase current detection value, calculate, based on the torque command, a command current directed to the electric motor as a phase current command value, and determine presence or absence of a disconnection of the AC cable in each phase from a transition result of a difference value between the phase current command value and the phase current detection value in each phase, and wherein the controller is configured to execute switching control so as to stop driving of the switching element when the disconnection detector detects the disconnection of the AC cable.

7. A cable disconnection detection method, which is executed in a control device for an electric motor, the control device for an electric motor including:

a controller configured to apply switching control to a switching element, which is provided in an inverter configured to invert DC power supplied from a DC power supply to AC power, in accordance with a torque command supplied from an outside, to thereby control the AC power to be supplied to the electric motor; and a current sensor configured to detect a phase current, which flows through an AC cable configured to connect the electric motor and the inverter to each other, the cable disconnection detection method, which is executed by the controller, comprising:

storing in advance, in a memory, a determination threshold value and a disconnection determination number of times, which are used to determine presence or absence of a disconnection of the AC cable;

acquiring the phase current detected by the current sensor as a phase current detection value;

calculating, based on the torque command, a command current directed to the electric motor as a phase current command value;

calculating, for each phase, a difference value between the phase current detection value and the phase current command value in each calculation cycle, and integrating respective difference values calculated over a plurality of calculation cycles included in a period from a calculation start point to a calculation end point, to thereby repeatedly calculate an integration value corresponding to the period; and calculating a ratio between a previous value and a current value of the integration value, and determining that a disconnection of the AC cable has occurred when a state in which the ratio is higher than the determination threshold value stored in the memory continues for the disconnection determination number of times stored in the memory.

* * * * *